(12) United States Patent
Bangtsson et al.

(10) Patent No.: US 12,223,716 B2
(45) Date of Patent: *Feb. 11, 2025

(54) BIOPROCESS SYSTEM AND METHOD PROVIDING AUTOMATED CONFIGURATION DETECTION

(71) Applicant: Cytiva Sweden AB, Uppsala (SE)

(72) Inventors: Petra Bangtsson, Uppsala (SE); Johan Arthursson, Uppsala (SE); Key Hyckenberg, Uppsala (SE); Lotta Hedkvist, Uppsala (SE)

(73) Assignee: Cytiva Sweden AB, Uppsala (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/525,144

(22) Filed: Nov. 30, 2023

(65) Prior Publication Data

US 2024/0096096 A1 Mar. 21, 2024

Related U.S. Application Data

(63) Continuation of application No. 17/822,068, filed on Aug. 24, 2022, now Pat. No. 11,961,295, which is a
(Continued)

(30) Foreign Application Priority Data

May 30, 2018 (GB) .................... 1808801

(51) Int. Cl.
*G06K 9/00* (2022.01)
*G06T 7/00* (2017.01)
(Continued)

(52) U.S. Cl.
CPC .............. *G06V 20/20* (2022.01); *G06T 7/001* (2013.01); *G06T 11/00* (2013.01); *G06T 2207/30164* (2013.01)

(58) Field of Classification Search
CPC ......... G06T 19/006; G06T 7/001; G06T 7/13; G06K 9/00744; G16H 40/20; G16H 70/20; G16H 40/67; A61F 2/90
See application file for complete search history.

(56) References Cited

U.S. PATENT DOCUMENTS 6,701,003 B1 * 3/2004 Feinstein ............. G06V 30/422
382/199
2005/0286754 A1 * 12/2005 Thomas ............... H05K 13/083
700/121
(Continued)

FOREIGN PATENT DOCUMENTS

CN 102694993 A 9/2012
CN 103889533 A 6/2014
(Continued)

OTHER PUBLICATIONS

PCT International Search Report and Written Opinion for PCT/EP2019/063075 mailed Jul. 3, 2019 (11 pages).
(Continued)

*Primary Examiner* — Phuoc H Doan
(74) *Attorney, Agent, or Firm* — Eversheds-Sutherland (US) LLP

(57) ABSTRACT

A method of automated configuration in a bioprocess system and to verify a process defined by a flow path representation. The method comprises the steps of: capturing one image of the bioprocess system comprising tubing for the fluid communication between units of the bioprocess system; analyzing the captured image to identify the tubing connecting units of the bioprocess system; producing a processed representation from the captured image wherein at least a part of the tubing is identified; and comparing the processed representation with the flow path representation to verify their functional concordance.

10 Claims, 10 Drawing Sheets

Related U.S. Application Data continuation of application No. 17/056,484, filed as application No. PCT/EP2019/063075 on May 21, 2019, now Pat. No. 11,455,797.

(51) Int. Cl.
*G06T 11/00* (2006.01)
*G06V 20/20* (2022.01)

(56) References Cited

U.S. PATENT DOCUMENTS

| | | |
|---|---|---|
| 2013/0278635 A1 | 10/2013 | Maggiore |
| 2018/0137613 A1 | 5/2018 | Mennicken et al. |
| 2021/0201032 A1 | 7/2021 | Bangtsson et al. |

FOREIGN PATENT DOCUMENTS

| | | |
|---|---|---|
| CN | 104040576 A | 9/2014 |
| CN | 108090797 A | 5/2018 |
| EP | 1742181 A2 | 1/2007 |
| EP | 1898327 A1 | 3/2008 |
| JP | 200097924 A | 4/2000 |
| JP | 2007108006 A | 4/2007 |
| JP | 2012529650 A | 11/2012 |
| JP | 2015099413 A | 5/2015 |
| JP | 2016173255 A | 9/2016 |
| WO | 2017045746 A1 | 3/2017 |

OTHER PUBLICATIONS

Great Britain Combined Search and Examination Report for GB Application No. 1808801.3 mailed Nov. 6, 2018 (6 pages).
Kahn et al., "3D Discrepancy Check via Autmented Reality," Mixed and Augmented Reality, 2010, 9th IEEE International Symposium.
Japanese Office Action for JP Application No. 2020-561894 mailed May 8, 2023 (7 pages, with English translation).
Chinese Office Action in CN Application No. 201980036001.2, mailed Jan. 25, 2024, 31 pages.
Chinese Search Report in CN Application No. 201980036001.2, mailed Jan. 23, 2024, 3 pages.
Wu, Hai-hao et al., "Oil Field Equipment, No. 8", New Technology and Equipment of Oil, Aug. 25, 2012, pp. 30-35. (abstract).

\* cited by examiner

BIOPROCESS SYSTEM AND METHOD PROVIDING AUTOMATED CONFIGURATION DETECTION

CROSS REFERENCE TO RELATED APPLICATIONS

This application is a continuation of U.S. patent application Ser. No. 17/822,068 filed Aug. 24, 2022, which is a continuation of U.S. patent application Ser. No. 17/056,484 filed Nov. 18, 2020, which claims the priority benefit of PCT/EP2019/063075 filed on May 21, 2019, which claims the benefit of Great Britain Application No. 1808801.3 filed on May 30, 2018, the entire contents of which are incorporated by reference herein.

TECHNICAL FIELD OF THE INVENTION

The present invention relates to a bioprocess system and in particular to a system and a method to detect and validate a system configuration.

BACKGROUND OF THE INVENTION

Modern bioprocess systems such as chromatography systems are typically provided to the end user as modular and highly flexible systems. The modern bioprocess system typically comprises a frame or rack in which a plurality of valves, pumps, detectors, fraction collectors etc. in the form of separate modules may be mounted. The modules are typically having connections for electrical power and electronic communication on their backside facing the interior backside of the mounting frame. A CPU and a bus system or similar provide the electronic communication ability as well as connects the bioprocess system to a PC, a tablet or a dedicated computer or the like, for controlling the processes, presenting information and results, storing information and external communication. Fluid communication between the modules is typically provided by flexible tubing on the front side of the modules. Different functionality is provided by different configuration wherein one configuration utilizes a subset of the modules and another configuration utilizes a different subset. A configuration is typically linked to a flow path that represents the involved modules, their fluidic connections and the functionality. The flow paths are tools to both set up different functions such as a detection using chromatography connected and to monitor the processes. The flow paths are commonly graphically presented on the PC, often as a part of a GUI.

The bioprocess systems are typically delivered with a number of predefined configurations including the relevant modules including the tubing providing the fluidic communication between the modules. Alternatively, the bioprocess systems are provided "non-pre-configured" and the mounting frame as well as the modules and tubing are purchased separately and built up by the end user. In either case, an end user can configure their own system either by modifying an existing one or building up a new configuration from scratch. Similar a modification of an existing bioprocess system may run from replacing worn out or contaminated tubing to testing and implementing a completely new configuration. Through the built-in electronic communication system and the electronic identification of the separate modules, a link between the representation of the flow path and the modules is automatically provided by the bioprocess system. A similar automatic functionality does not exist for the fluidic communication. Instead the front side of the bioprocess frame is typically inspected visually by the user. The graphic representations of the flow paths may contain notes or figures indicating the actual connections between the modules as an aiding tool. In addition, a user often uses notes, sketches or images to document a set-up. However, as a modern bioprocess system simultaneously can provide a large number of different functions, flow paths, and since the flexibility in the choice of modules and their position in the frame is so large the complexity may be very high. In addition, the sheer number of tubing segments, their loops and possible entanglement makes it difficult to link a flow path to the correct set of tubing. The problem is most apparent in modular bioprocess systems, but exists to a high degree also in non-modular bioprocess systems since the tubing may be equally complex and errors may be made if replacing the tubing or part of the tubing, for example.

U.S. Pat. No. 8,821,718 describes a bioprocess system which advantageously would benefit from the method and system according to the present invention and is hereby incorporated by reference in its entirety.

U.S. Pat. No. 9,304,518 discloses a system and method to assist in identifying and coordinating the fluid connections between modules in a modular bioprocess system and is hereby incorporated by reference in its entirety. The system disclosed in U.S. Pat. No. 9,304,518 requires both new hardware and software in order to make the stated advantages available to a user and may therefore not be fully utilized with existing systems.

SUMMARY

An object of the invention is to provide a method of verifying or validating that the physical configuration of a bioprocess system is in correspondence with the flow paths defined in the system software. This is particularly relevant in a modular bioprocess system wherein units and tubing may have been rearranged.

This is achieved by the method for a bioprocess system according to the independent claim.

The method according to the invention of automated configuration detection in a bioprocess system, wherein the process is defined by a flow path representation, comprises the steps of:

Capturing at least one image of the bioprocess system comprising tubing for the fluid communication between units of the bioprocess system.

Analyzing in an analyzing routine, the at least one captured image to identify at least a part of the tubing connecting units of the bioprocess system.

Producing a processed representation from the at least one captured image wherein at least a part of the tubing is identified.

According to one aspect of the invention, verification is performed by a step of comparing the processed representation with the flow path representation to verify their functional concordance. The step of comparing may be an automated step. Alternatively, the comparison is made by a user of the bioprocess system using the processed representation, for example in the form of a processed image and the flow path representation in form of the flow path graph.

According to one aspect of the invention the processed representation comprises a processed image and optionally also listings describing the tubing and how it interconnects the modules/units of the bioprocess system.

The method according to the invention may utilize at least two captured images to produce the processed representation. The image analyzing routine may determine that more images are required or at least could be advantageously used in the identification of the tubing and/or units and produce and forward an instruction to the operator to capture one more image. The analyzing routine may also identify that an active action is needed to be able to identify separate features in the image and instruct the operator to perfume an active action, for example to move a portion of the tubing, spread out a tubing bundle, change the position of the camera or change the lightning, for example.

According to one aspect of the invention the image analyzing routines transfer an instruction to capture additional images or alternatively a notification to stop capturing images to the user. The instruction may be complemented with instructions to perform an active action.

The image analysis may utilize a priori information relating to the bioprocess system. Examples of a priori information include, but are not limited to, knowledge of the types of units existing in the present bioprocess system, coloring of part of the tubing, identification labels etc.

According to one aspect of the invention a user utilizes a camera to capture a plurality of images and in the analyzing step the user receives a notification to capture additional images or alternatively the user receives a notification to stop capturing images.

The method according to the invention may comprise a step of producing an augmented live view image of the bioprocess system utilizing the processed representation in the form of a processed image, wherein in the augmented live view image part of the tubing is distinguishably marked.

The method according to the invention may comprise a step of producing an augmented live view image of the bioprocess system illustrating at least one step in the process represented by the flow path representation utilizing the processed representation at least including a processed image to, in the augmented live view image, visually mark the part of the tubing and units engaged in the particular process step.

The method according to the invention may be used to facilitate a setup or a modification of the bioprocess system. An augmented live view image of the bioprocess system may be produced, indicating to a user where at least one individual tubing connection should be connected. In the flow path representation at least one individual tubing connection corresponding to a portion of the flow path is identified and units to be used in portion of the flow path are identified and the identified units are marked in the augmented live view image. A processed image may be used, at least in part, as an overlay to the live view image as one component in the augmented live view image.

According to one aspect of the invention the processed representation is compared to the flow path representation to identified faulty connected and/or missing parts of the tubing.

Thanks to the method and system according to the invention an automated configuration detection of a bioprocess system can be provided. This is of particular importance for modular and/or complex setups wherein it may be very difficult to sort out the configuration by only optical inspection.

One advantage of the invention is that the automated detection may be used to link the processed representation (image and/or listing, for example) to the flow path representation. The established link may be used for validating the system, but also for troubleshooting, facilitate setup or modifications and to gather user information. Compared to manual procedures presently available, this represents major improvements.

BRIEF DESCRIPTION OF THE DRAWINGS

FIGS. 1A-1C a schematically illustrates a bioprocess system wherein the method according to the invention could be utilized wherein, FIG. 1A illustrates a mounting frame in a perspective view.

FIGS. 2A-2B show an illustration of a flow path typical for a bioprocess system wherein the method according to the invention could be utilized;

DETAILED DESCRIPTION OF THE INVENTION

Figure 1A:
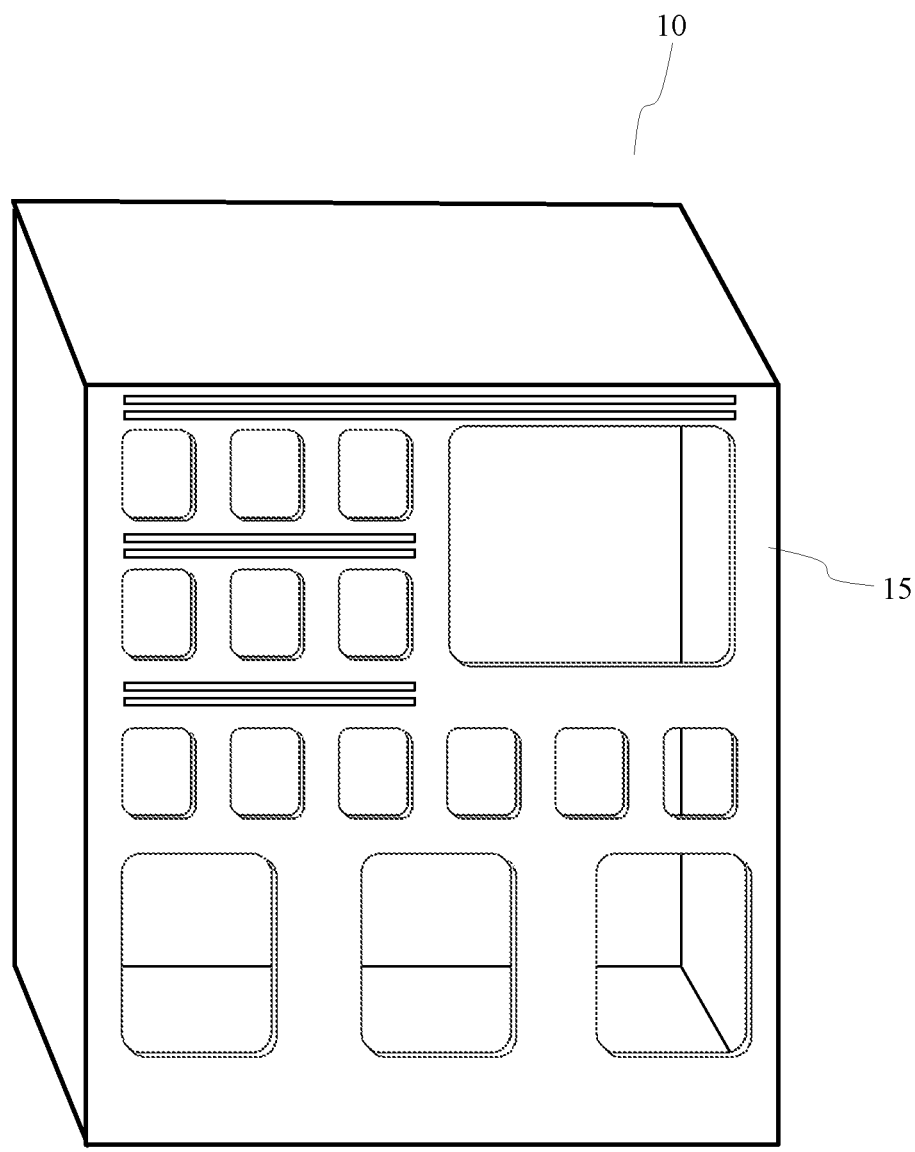
Figure 1B:
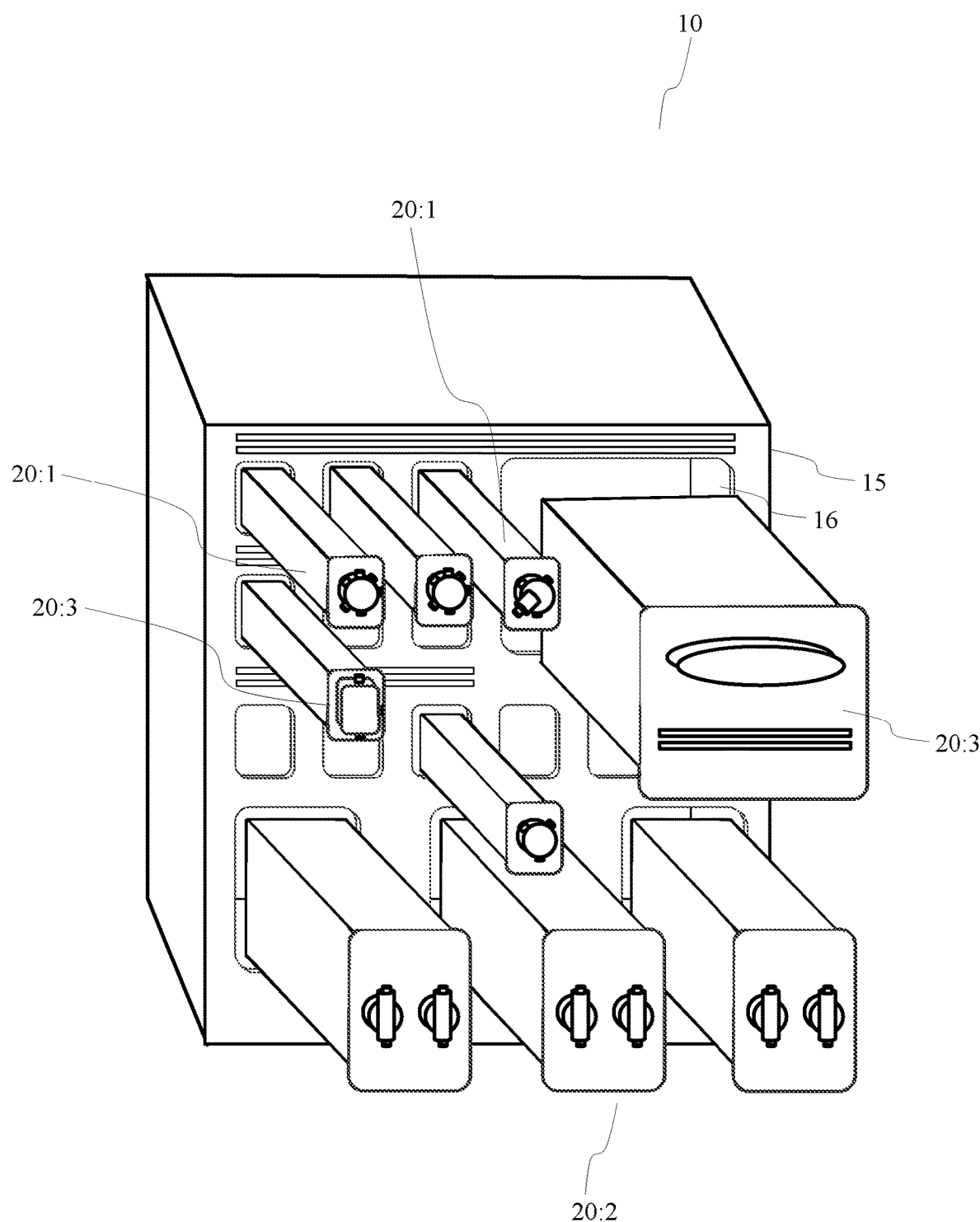
Figure 1C:
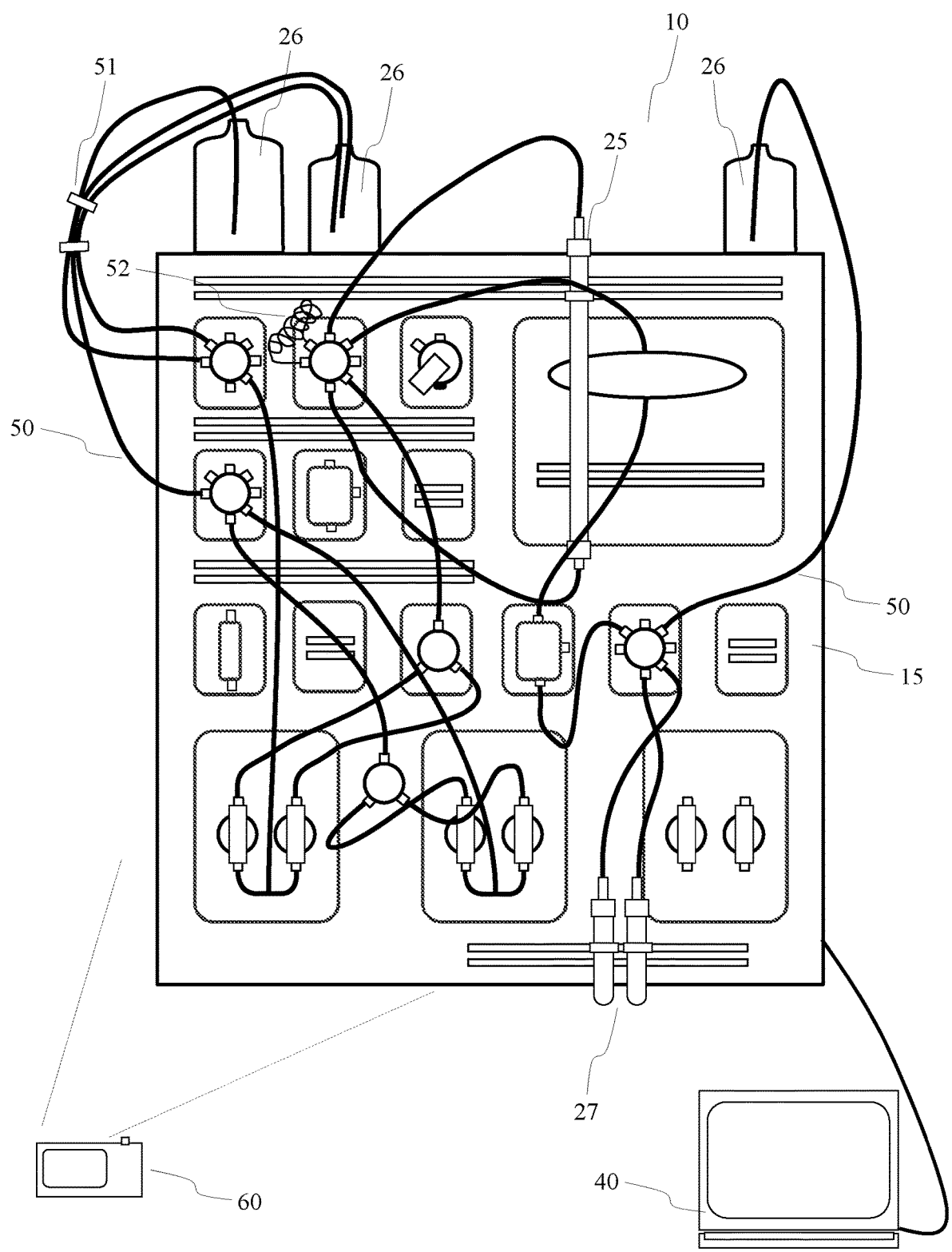

The method according the invention relates to setting up, validating and maintaining a bioprocess system, in particular a modular bioprocess system, for example a chromatography system. A suitable modular bioprocess system is schematically depicted in FIGS. 1A-1C, wherein FIG. 1A is a mounting frame in a perspective view, FIG. 1B is the mounting frame with a plurality of modules providing different functions in the system in an exploded perspective view system and 1c in a frontal view and FIG. 1C is a complete bioprocess system in a frontal view. The bioprocess system 10 comprises a mounting frame 15, with a plurality of compartments 16 in which modules 20 may be accommodated. The compartments 16 may typically accommodate one module each, and may be of different size, but preferably only in few standardized sizes. A wide range of modules may be installed in the system, including but not limited to pump modules, valve modules, detector modules, mixing modules and fraction collectors. In the figures the modules 20 are exemplified by a plurality of valve modules 20:1 off different varieties, a plurality of pump modules 20:2 and a plurality of detection modules 20:3. The bioprocess system 10 may typically also be equipped with one or more chromatography columns 25, liquid storage containers 26 and containers 27 for receiving separated fractions, for example. Also, other pieces of equipment (not shown) may be provided on or nearby the mounting frame. The modules 20, chromatography columns 25 and other equipment being part of the bioprocess system 10 will be referred to as units and types of units of the bioprocess system.

The mounting frame 15 is in communicative connection with a processing unit 40. The processing unit 40 may for example be an in the mounting frame integrated CPU, a stand-alone PC, a laptop PC or a tablet and typically comprises a software suit to control the bioprocess system 10, including the algorithm and routines needed to perform measurements or production, setting up the system, maintaining the system, storing and analyzing data etc. The software suit may be a combination of for example proprietary software provided from the bioprocess system manufacturer, open software providing specific analysis and routines and modifications generated by the end-user to adapt the system to specific requirements. The term "system software" will hereinafter be used to refer to the software required to set up, run and maintain the bioprocess system.

Data and system information is typically presented on a graphical unit interface, GUI, for example a touch screen 41 in connection with the processing unit 40.

The modules 20 are provided with electrical contacts on their back side arranged to mate with corresponding electrical contacts provided in the compartments 16 of the mounting frame 15. The electrical contacts transfer both signals to and from the modules 20 to the mounting frame 15 and provides power to the modules for their operation. The modules 20 have individual means for identification, referred to as a module ID, which can be read by, or transferred to, the processing unit 40. Currently commercially available bioprocess systems typically do not have the ability to provide information on the exact position of a module 20 in the mounting frame 15 to the system software. With the modular systems and the user's possibility to reconfigure the system, the system software may not know the position of a module, even if that position was known as delivered in a pre-configured state. In addition, some bioprocess systems have the possibility of incorporating into the system, add-on modules either alone or in smaller mounting frames comprising a few module positions. In other words, the system software knows which modules are available and their respective functions and parameters, but not their position. Future bioprocess systems with knowledge of the exact position of individual modules could be envisaged, for example by providing the modules 20 with RFID-tags. Such position information could be utilized in the method according to the invention, which will be exemplified below.

The bioprocess system 10 is provided with a network of tubing 50, providing fluid communication between the different units of the bioprocess system 10, such as the modules 20, the chromatography column 25 and storage containers 26. The tubing 50 can run between the units as separate entities, but may also be joined in tubing bundles 51. The tubing 50 may be for transportation only, but may also have a function by themselves, for example forming loops 52 or being part of a detection device, or running through a peristaltic pump. The tubing 50 is typically disposable and regularly replaced either due to wear or contamination. The tubing 50 are commonly connected to valves and other units of the modules 20 via connectors known as fingertight fittings, which provide a tool-less operation. The individual tubing connections are typically tubing of standardized inner dimensions so that a certain length will hold a predictable volume. The tubing connections may be color coded so that a specific color means a specific inner diameter. To some extent the inner diameters are reflected on the outer diameters of the tubing connections in so that tubing connections of different thickness may be distinguished. However, there is no direct or standardized relation between the inner and outer diameter of the tubing.

A camera 60 is provided for acquiring images of the modular bioprocess system 10. The camera 60 may be a dedicated camera but equally well a device with a camera facility such as a smart phone, tablet or laptop computer. The camera 60 is equipped to transfer a captured image to the processing unit 40 for example and preferably wirelessly, for example via Bluetooth or WiFi.

The communication system outlined above should be seen as a functional description. As realized by the skilled person communication between different entities in a system may be realized in many different ways. In addition, communication is an area of rapid development. Different standards and protocols could be used for the communication and the communication may be wire-bound, as described above, or wireless or a combination of the two. For example, the signaling between the modules 20 and the processing unit 40 may be via a wireless protocol such as NFC or Bluetooth and the electrical contacts primarily providing power to the modules. Another possibility is that units in the system such as the modules 20, the mounting frame 15 and the processing unit 40 are individually connected to a WiFi and the communication between n the units is indirect via the WiFi.

A specific process utilizing at least one flow path, to be performed by the bioprocess system 10 is defined by a script in the system software. A number of scripts are typically provided by the system manufacturer, but may also be programmed by the end-user or provided by a third part provider. The end-user may also choose to modify an existing script in order to customize a process.

Figure 2A:
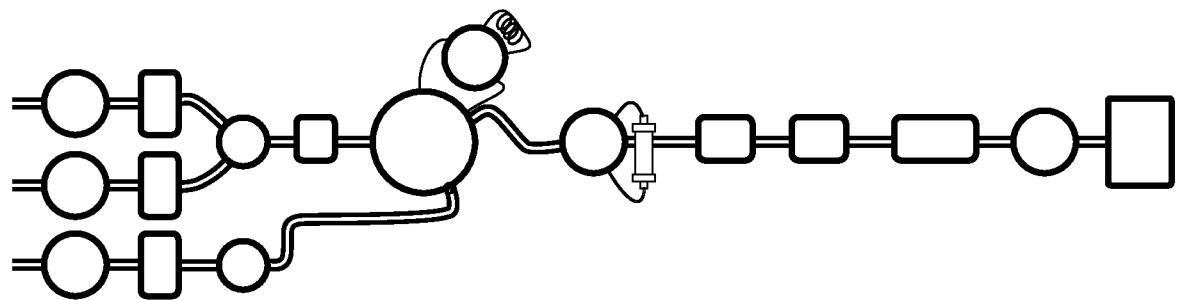

The script is often complemented by a process image or flow path graph given a graphical presentation of the process according to the script and also serves as a graphical interface to the process. In the following the term "flow path representation" is used to describe the information held by the system software describing a particular configuration in a functional way. It should be understood that "flow path representation" may be a process image or flow path graph and may also contain non-graphical information or comprises entirely of non-graphical information. FIG. 2A is an example of a flow path graph, presented to the user on the GUI 41, for example. The flow path graph in FIG. 2A represents a detection process utilizing a chromatography column 25 and a UV-detector in combination with a plurality of valves and pumps.

The flow path representations can be used in a multitude of ways. In a pre-configure process the user uses the flow path representations to visualize and understand the process and for example switch valve positions. During a run the user can monitor the process in real time via the flow path representation corresponding to the process. Flow path representations may in certain cases also be used to modify an existing process or set up a completely new process, although most software suits associated to bioprocess system s do not yet allow this type of high level object programming From the electronic/electrical communication point of view the processing unit may be updated on all time so that a change indicated in a flow path representation automatically is reflected in how the modules and other units interact. However, for the fluid communication, i.e. the tubing, no such control and automation is possible with today's systems—the user must manually see to that the tubing matches the flow path.

The method according to the invention comprises a dedicated image analysis optimized for an automated detection of a configuration of the bioprocess system.

According to one aspect of the invention the result of the image analysis is used to verify at least one aspect of the functionality of the bioprocess system (10), typically a functionality relating to a specific process executed or to be executed by the bioprocess system 10 and defined by the flow path representation.

Figure 3:
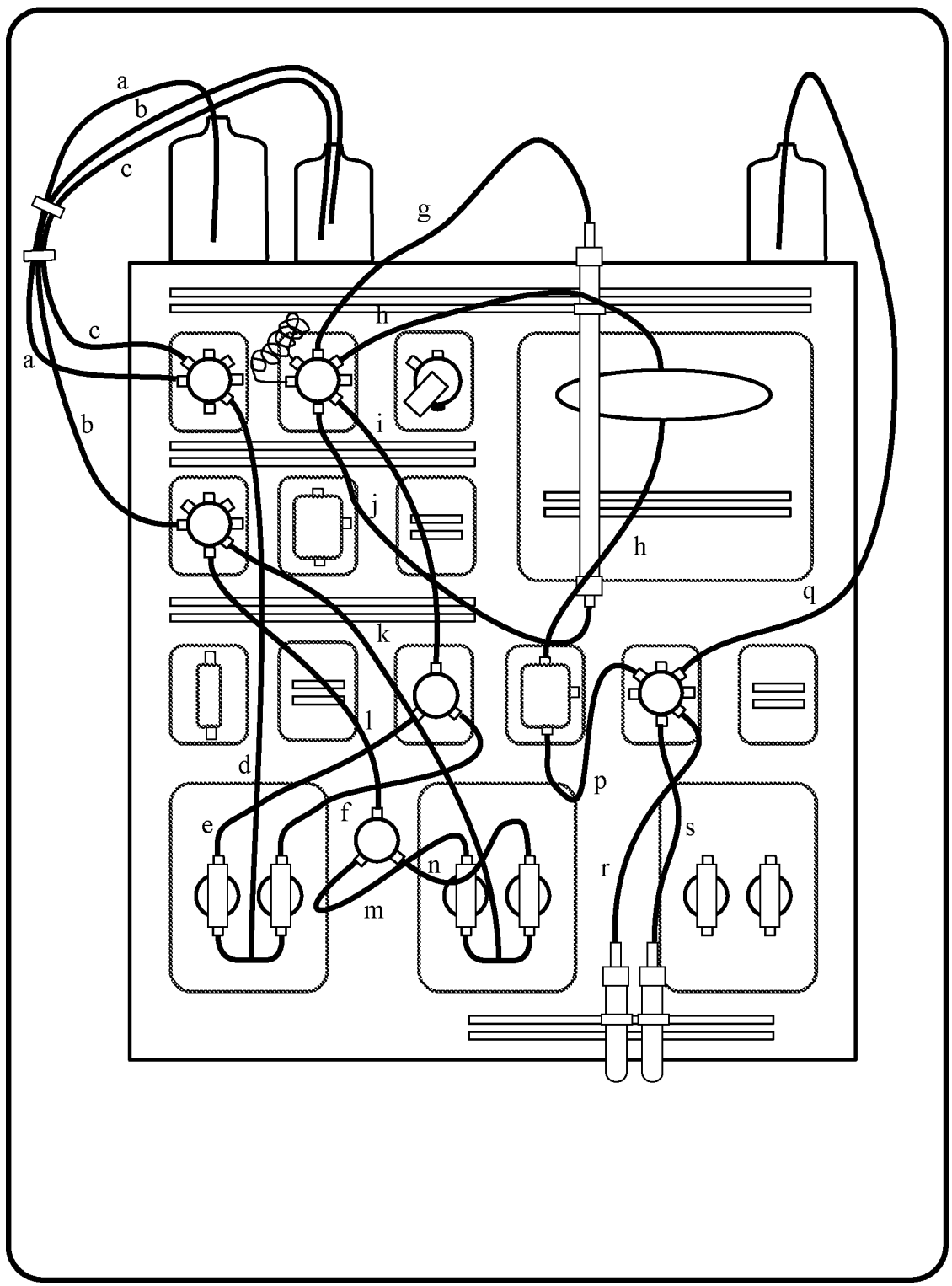
FIG. 3 is a schematic illustration of a processed image produced by method according to the invention.

Through image analyze of at least one photographic image of the bioprocess system generating a processed representation or other information identifying characteristic elements in the image. The characteristic elements including, but not limited to, the tubing or part of the tubing. The image analysis comprises the steps of:

a) Capturing at least one image of the bioprocess system 10, typically of the front side the bioprocess system 10.

b) Analyzing the captured image to identify at least part of the tubing 50. Optionally also other units of the bioprocess system 10 are identified. The analyzing is preferably performed by an image analyzing routine residing either in the camera 60 or in the processing unit 40. Alternatively, the analyzing routine is residing in a remote server or the like, to which the camera 60 or the processing unit 40 can communicate.

c) Producing a processed representation wherein at least a portion of the individual tubing connections are identified. The processed representation may be graphical, for example as processed image with identified tubing connections distinguishably marked, for example by separate artificial colors, and/or in the form of listing of identified tubing connections and units to which they connect. FIG. 3 illustrates a processed image as it could be presented to a user on a GUI. All individual tubing connections are identified as objects in the image, in FIG. 3 illustrated by the individual tubing connections are given a reference a-q. In a real life processed image it may be more convenient to give the identified individual tubing connections a color coding or other graphical identification. The processed image may be a schematic illustration as illustrated in FIG. 3 or alternatively a photo of the front of the bioprocess system with the identified tubing as an artificial overlay, for example. Also other objects, for example valves and detectors may have been identified as recognizable objects and presented as artificial overlays. The processed image may be presented to the user together with the listing of identified tubing and units or the listing could be presented separately, for example on demand A number of options how the processed image should be presented could be selectable by the user.

In the image analysis a plurality of images may be utilized, which represents one aspect of the invention. One example there using a plurality of images is to identify individual tubing in a bundle. By using a plurality of images, for example taken at different angles and/or from different positions, tubing, or portions of tubing, that are hidden in one view might be visible in another view and utilizing more than one image may facilitate the identification. The camera operator may be instructed by the image analyzing program to capture further images from various positions until the image analyzing program has been able to identify objects to a certain predefined level of certainty.

According to one aspect of the invention the camera operator is by the analyzing program instructed to perform active actions to help the image analyzing. A set of possible active actions are predetermined and stored in the system together with information on which kind of identification problem the active action relates to. Typically, a problem area is identified during the image analysis, for example an area with a complex tubing bundle. Other problems may be general, for example poor lighting, which renders the analysis as a whole problematic Active actions may include, but is not limited to:

change angle and/or distance between the camera 60 and the bioprocess system 10 change lighting conditions, spread out a tubing bundle so that individual tubing connections are visible, move one tubing connection so that that tubing connection may be identified in a nest of tubing or in a bundle. Such identification may be simplified if the tubing is provided with some type of marking, for example dots or transverse stripes at preferably regular intervals, move part of the tubing so that a label or other means of fixed identification on a module, for example, may be visible.

move a label on the tubing, if such labels are used.

For some of the above active actions it may be advantageous to use video instead of still images and image analysis should be interpreted as including video analysis if such is appropriate.

If a plurality of images, or a video, is utilized, steps A and B can be seen as a loop that is run as long as required to perform the identification.

According to one aspect of the invention image analysis with a priori knowledge is utilized. The a priori knowledge may be, but is not limited to, information on which type of modules 20 and other units that are present in/on the mounting frame 15, the modules 20 position in the frame, if such information is available, information on units and their order in a particular flow path and initial configurations relating to the bioprocess system 10 "as delivered". The image analysis routine/program may also utilize markers on the mounting frame 15 or the units to scale and/or align captured images. These markers may be provided on the bioprocess system for this purpose, but may also be features already present such as logotypes, model numbers or other visually distinguished features, for which size and color etc. is known. The image analysis may further utilize that a limited number of known shapes are likely to be found in the image. For example the long thin tubing, the characteristic shape of the valves, pumps and columns, and even the color of the objects. The color of the tubing and/or the outer diameter, however not standardized, could still be useful to identify a specific tubing connection going into and out from a tubing bundle, for example. Other knowledge, such that in certain pumps and detectors the tubing is passing through the device, could be used to identify that it is the same tubing connection, although obscured from sight while within the device. The a priori knowledge is preferably provided in one or more database accessible by the unit performing the image analysis, for example the processing unit 60. The prior art knowledge database may be a local database or a centralized database accessible via a client-server set-up, for example housed and maintained by the manufacturer. A client server set-up would facilitate updating the a priori knowledge database, for example if new modules are introduced or modules are modified in their appearance. Alternatively, if the a priori knowledge database is local, it may be updated from a central database on regular intervals and/or on demand.

The image analysis routine may comprise a confirmation step, wherein the user verifies that a suggested processed image, or part of the processed image corresponds to the user's perception of the bioprocess system.

The image analysis, main step B), is typically performed in the processing unit 40, and the captured images captured by camera 60 are transmitted to the processing unit 40. Alternatively, the processing capacity of the capturing device, for example a smart phone is utilized for at least part of the image processing and processed representations are transferred to the processing unit 40.

According to one aspect of the invention the image analysis is based on image data solely, i.e. information which generates only from the individual pixels in the image, which is referred to as image analysis without a priori knowledge.

The image analysis may further comprise a number of operations well known in the art of automated image analysis. Such operations include, but is not limited to: alignment/ straightening, scaling, segmentation and feature isolation. The image analysis may utilize Artificial Intelligence techniques for the identification of features such as neural networks and deep learning.

The result of the image analysis, represented by the processed representation, may be used to verify aspect of the functionality of the system. Verifying aspects of the functionality should be given a broad interpretation including verifying the tubing corresponds to a process defined by flow path representation (for example a flow path graph), troubleshooting, optimization, visualization of a measurement/separation procedure, setting up or modifying a process etc. As an example, the processed representation in form of a processed image and/or listing provides a way of verifying that a process, for example represented by a flow path graph is correctly configured with regards to the fluid communication in the bioprocess system 10, in particular with regards to the tubing 50 and units.

According to one aspect of the invention the functional concordance between the flow path representation and the actual tubing is verified by comparing the processed representation resulting from the image analysis with the flow path representation. This could be a manual process wherein the user compares for example a flow path graph with a processed image and/or listing to verify that flow paths corresponds with the tubing. Alternatively, it is an automated process. The procedure, either if manual or automated, may include that the user approves the concordance of the flow path representation and the processed representation.

According to one aspect of the invention a link is established between the flow path and the tubing and units utilizing image analysis performed on a photographic image of the bioprocess system. According to one embodiment the established link between the flow path and the network of tubing and units of the bioprocess system 10 is utilized to monitor a process run on the bioprocess system 10, to verify the process and/or modify or optimize the process.

According to one aspect of the invention the established link between the flow path and the units of the bioprocess system 10 is established so as to give visual aid in connecting the tubing to the various units to be engaged in the process relating to the flow path.

The processed representation may be presented to the user on the GUI connected to the processing unit 40. Alternatively, a separate screen or goggles, for example virtual reality goggles may be used for the presentation. According to one embodiment of the invention the result of the image analysis having identified one or more tubing is presented with the aid of augmented or virtual reality, AR or VR. With AR or VR, the visual identification of a plastic tube, or a set of tubing, is overlaid on a live image of the bioprocess system 10, forming an augmented image of the bioprocess system.

Figure 2B:
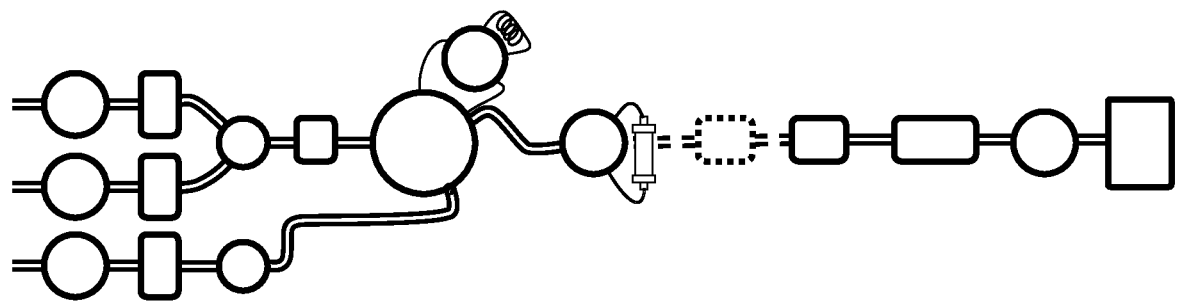
FIG. 2B illustrates a mounting frame with a plurality of modules in an exploded perspective view and FIG. 2Cc) as a complete bioprocess system in a frontal view.
Figure 4A:
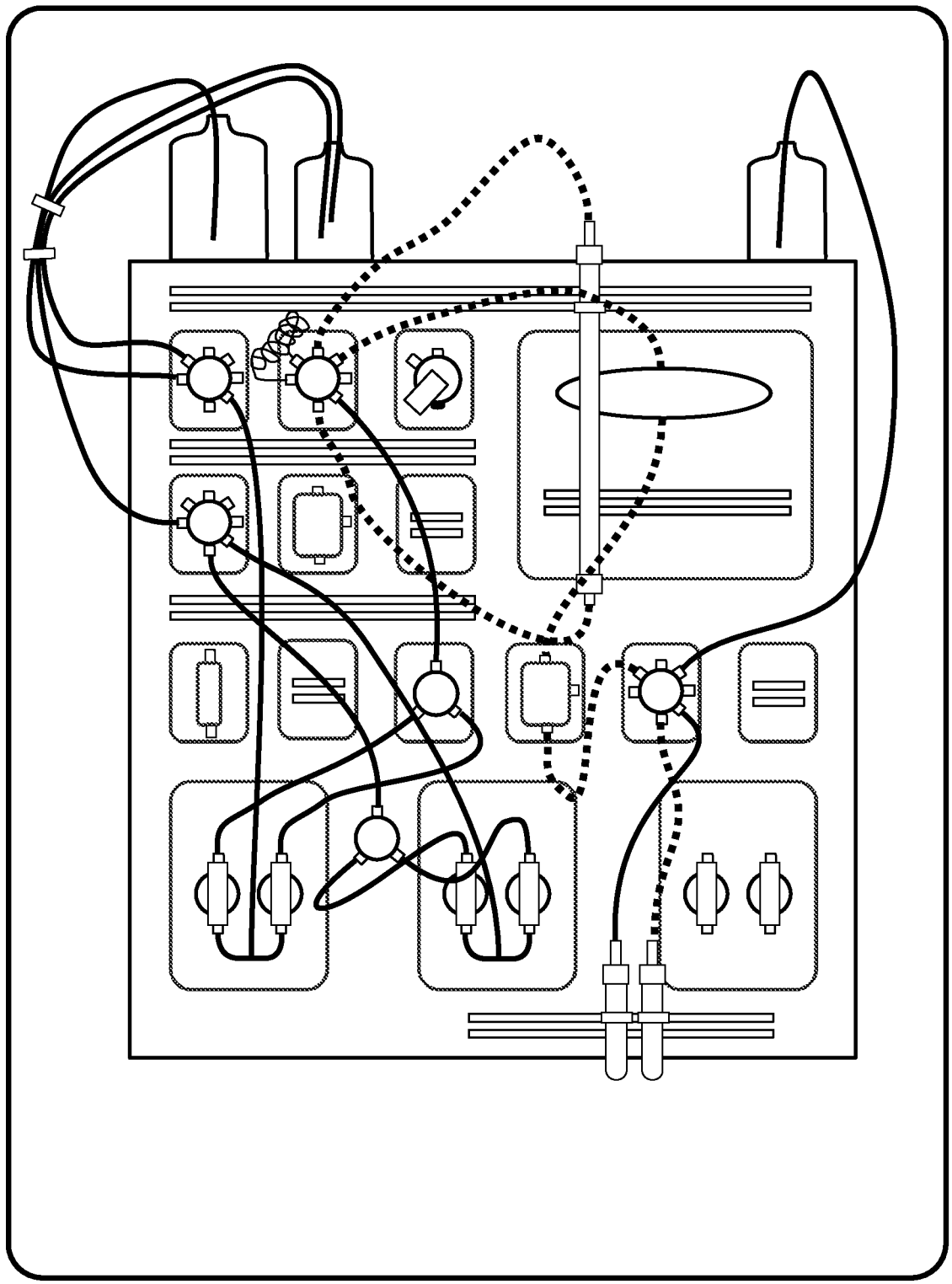
FIGS. 4A-4D are schematic illustrations of enhanced images and augmented live views produced by the method according to the invention.
Figure 4B:
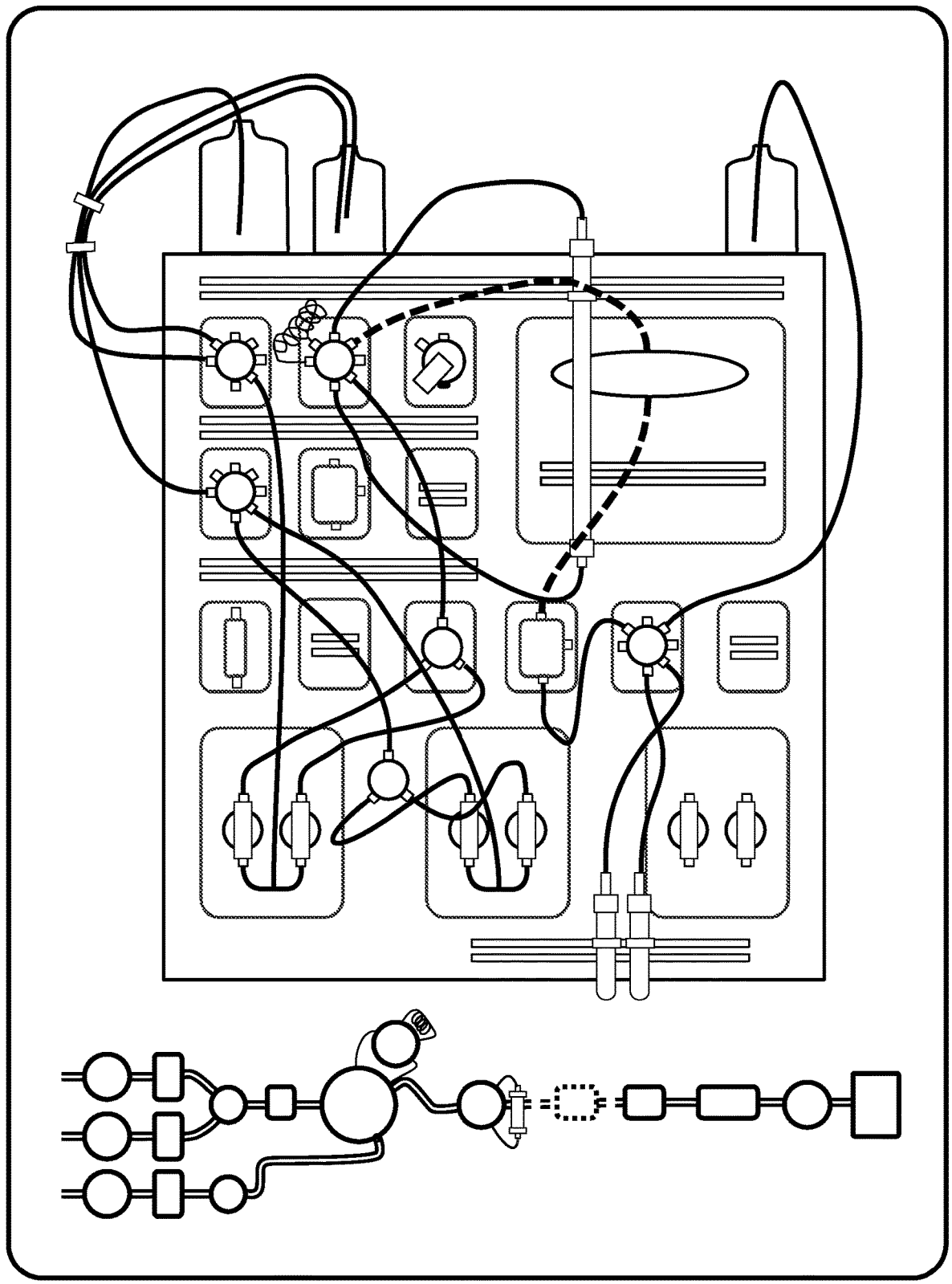
Figure 4C:
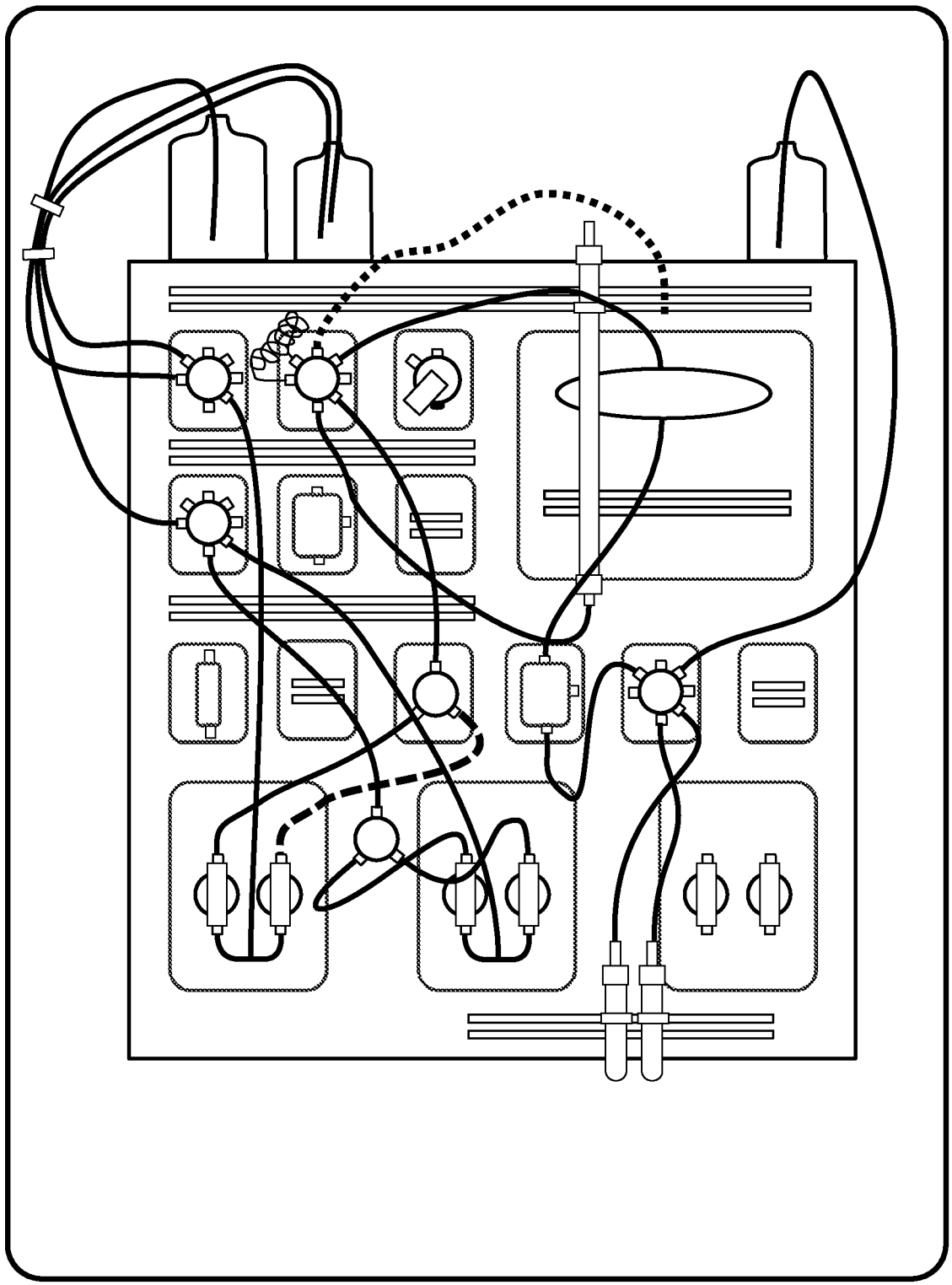
Figure 4D:
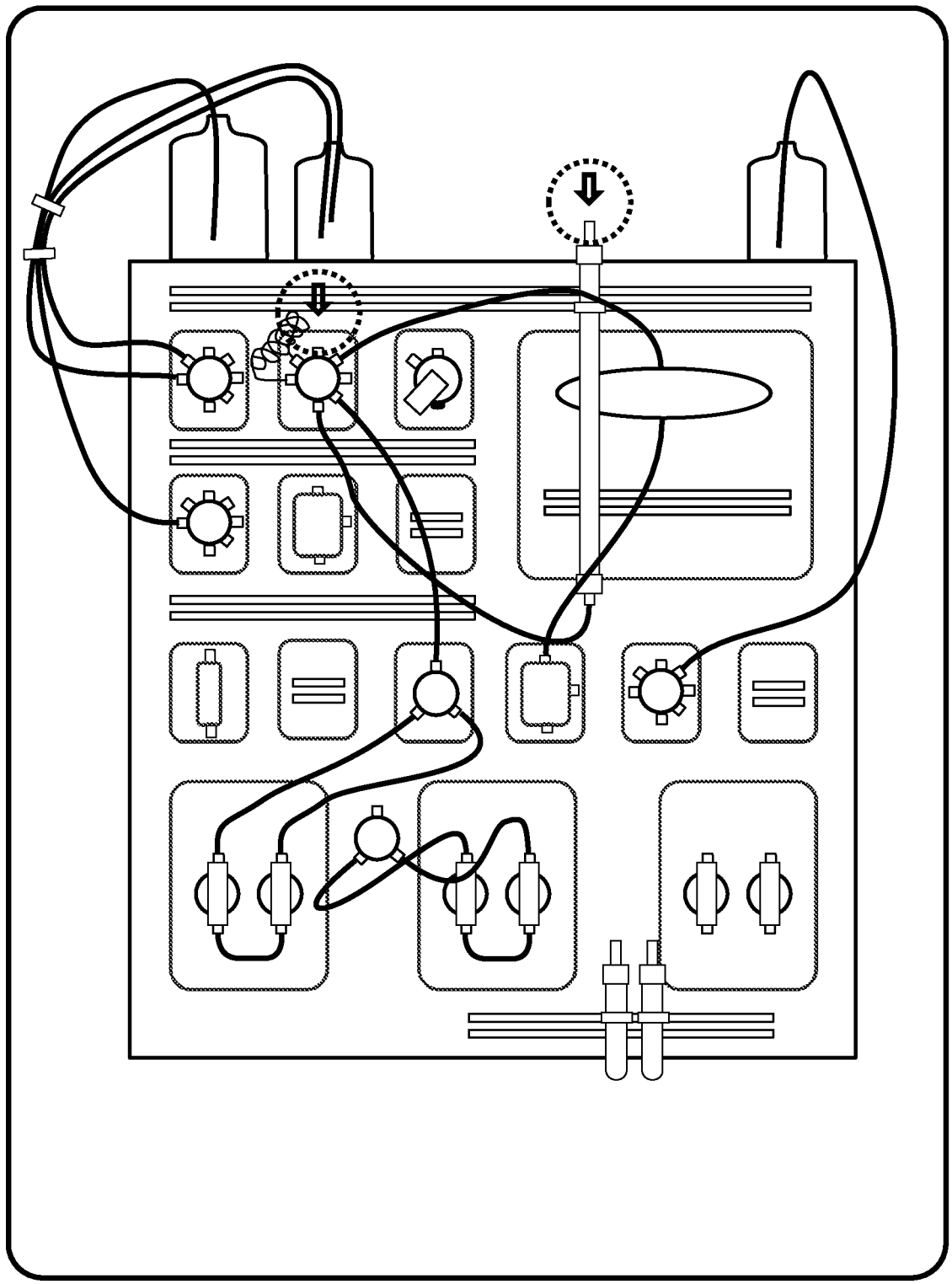

Verifying using the processed representation and the flow path representation according to one aspect of the invention may comprise one or more of the steps:

a) Linking the flow path representation to the processed image and producing an enhanced image, wherein tubing and optionally also modules/units belonging to the particular flow path a common identification, for example the same color. By that a plurality of tubing 50, and optionally modules 20 and other units utilized in the same process can in the processed image be grouped and identified. FIG. 4A schematically illustrates how, in an enhanced image as presented on the GUI to the user, a number of individual tubing connections which are utilized in the same process are marked as dashed lines. Alternatively, the processed representation in form of a listing is utilized and the linking to the flow path representation generates a list of relevant part(s) of the tubing 50.

b) Live view following the flow path: According to one aspect of the invention the established link between the flow path graph and the image of the bioprocess system 10 is utilized to present an augmented live view image. As the process proceeds tubing 50 and optionally modules 20 and in use are simultaneously marked, for example lit up, in the augmented live view image and also in the flow path graph. This is illustrated in FIG. 4B with an individual tubing connection being dashed in the augmented live image and the corresponding section in the flow path graph also dashed, see also FIG. 2B. Preferably, as indicated in the figure, the augmented live view image and the flow graph path are visible on the same screen. As an alternative one or a plurality of augmented still images may instead be presented. According to one embodiment the simultaneous marking of active modules and tubing are utilized by the user to verify that the network of tubing is correctly connected and corresponding to the flow path defining for example a measurement. The augmented live view or series of augmented still images may be recorded for later analysis. The flow path graph and the augmented live view image may be presented to the user simultaneously, for example on the same screen showing the flow path graph and the augmented live view image of the bioprocess system 10 with the tubing and/or unit currently under operation indicated in both the augmented live image and on the flow path.

c) Troubleshooting: According to one aspect of the invention the established link between the flow path representation and the image of the bioprocess system 10 is utilized to identify a malfunction of the bioprocess system. Such a malfunction could for example be a tubing connection missing or one end of a tubing connection not coupled to a finger tight. Some malfunctions could be identified from the processed image alone, such as a loose tubing end. Others could be identified by the link to the flow path representation by indicating discrepancies between the representations. A discrepancy, for example a missing tubing connection may be indicated on an augmented live view image, similar to above. In FIG. 4c a missing individual tubing connection is illustrated with a dashed line and a lose connection with a dotted line.

d) Assisting setup: According to one aspect of the invention the established link between the flow path representation and the image of the bioprocess system 10 is utilized to facilitate the setup of a new process or modify an existing process. The method comprises the substeps of:
  identifying or constructing a flow chart graph representing a new process or a modified process.
Using the established link between the flow path representation and the image of the bioprocess system 10 to produce one of, or a combination of:
  an enhanced image of the bioprocess system illustrating how the tubing 51 should be connected to units;
  a series of enhanced images stepwise illustrating how each tubing connection, or a selection of tubing, should be connected to units;
  an augmented live view of the bioprocess system 10 stepwise illustrating how each tubing connection, or a selection of tubing, should be connected to the units.
Schematically illustrated in FIG. 4D is how a live view, or still image, could indicate where an individual tubing connection should be connected, see the dotted circles and arrows in the top part of the image, indicating in which fingertight fittings the two ends of a tubing should be connected.

a) Collecting user information: If allowed by the end-user images or the processed representations could be forwarded to the manufacturer. This could be utilized for support, for example troubleshooting and also for the manufacturer to gather information on the use of the equipment. It could for example be of high value to identify common configurations and also configurations that not fully take advantage of the equipment's capabilities in order to provide the end-user with suggested improvements or provide new or modified pre-configurations.

Figure 5:
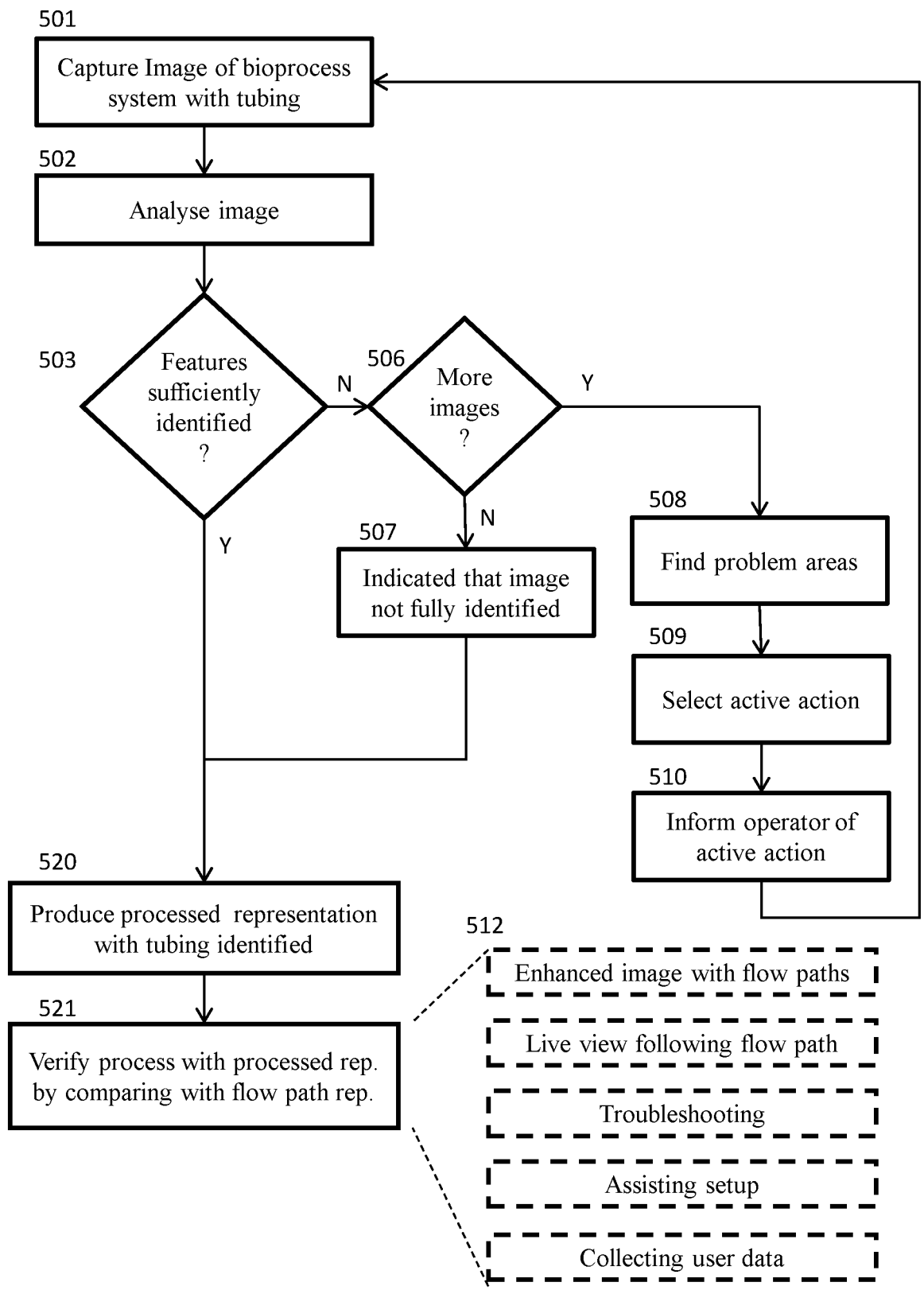
FIG. 5 is a flowchart of a method according to one embodiment of the invention.

A non-limiting example of an implementation of the method according to the invention is illustrated in the flowchart of FIG. 5, and comprises the steps of;

501 Capturing an image of a bioprocess system 10 provided with tubing 10.

502 Analyzing the captured image to identify at least part of the tubing 50. Optionally using a prior knowledge as described above.

503 Determine if the tubing and optionally other features from the captured image is sufficiently identified. For example, most of the tubing may be identified but in a certain portion of the captured image individual tubing connections appear to overlap so that the image analysis routine was not able to resolve individual tubing connections in that portion. If sufficient, continue to produce a processed representation in step 520. If not, continue to an evaluation how the image might be improved in step 506.

506 Determine if more images should be captured. If more images should be captured, proceed to step 508. If determined that more images would not improve, although the features are not fully identified, proceed to step 507.

507 Indicate that not all of the tubing and/or all other features were possible to identify, optionally including information of the position and extent of the problem areas of the image. A processed representation may still be of value and therefore proceed to producing a processed representation, step 520. This step may include and acknowledge a procedure, wherein the user approves/disapproves to go further to produce a processed representation.

508 Identify a problem area or problem areas, for example areas with unidentified or unresolved tubing are identified.

509 Select a suitable active action, for example moving a tube. A predetermined set of active actions are available and the selection is based on an analysis of the problem area.

510 Informing the operator on the selected active action and how it should be performed and which section of the bioprocess system it concerns. Go to the Capturing step 501.

520 Produce a processed representation with at least part of the tubing 50 identified. Optionally also other features such as the modules 20 and chromatography columns 25 are identified.

521 Verify the process run on the bioprocess system 10 by comparing the processed representation with the flow path representation for example the flow path graph. The verification may comprise, 512:

Produce an enhanced image indicating flow paths in use.

Produce an augmented live view image following the development of the process.

Troubleshooting, for example finding and indicating a missing part of the tubing.

Assisting setup of the bioprocess system by indicating how the tubing should be connected.

Collecting user data.

The described embodiments can be combined as should be apparent to the skilled person. For example, the embodiment of using the method according to the invention to assist setup of a bioprocess system may advantageously be combined with using the method according to the invention for troubleshooting. In many cases synergetic effects may be achieved by using various embodiments in combination. For example, if the method according to the invention to collect user data is implemented, the result of such collection and processing of user data, for example a suggestion to improve the process, could be presented to the user in an augmented live view.

The invention claimed is:

1. A method of automated configuration detection in a bioprocess system, the method comprises the steps of:
   forming a network of tubing in the bioprocess system, wherein the network of tubing is a network of disposable tubing for fluid communication between units of the bioprocess system,
   capturing at least one of: one or more images and videos of the bioprocess system comprising the network of tubing;
   analyzing, in an analyzing routine, the at least one captured image and/or video to identify at least a part of the tubing connecting units of the bioprocess system;
   producing a processed representation from the at least one captured image and/or video wherein at least a part of the tubing connection is identified;
   verifying a process defined by a flow path representation in the bioprocess system, comprising comparing the processed representation with the flow path representation to verify their functional concordance.

2. The method according to claim 1, the processed representation is compared to the flow path representation to identify faulty connected and/or missing parts of the tubing.

3. The method according to claim 1, further comprising:
   producing an augmented live view image of the bioprocess system illustrating at least one step in the process represented by the flow path representation utilizing the processed representation to visually mark the part of the tubing and units engaged in the particular process step in the augmented live view image.

4. The method according to claim 1, wherein the analyzing step further comprises:
   determining if additional images and/or videos could be useful to extract information required to produce the processed representation and, if additional images and/or videos are determined as useful, issuing a notification to capture additional images and/or videos.

5. The method according to claim 4, wherein the analyzing step further comprises:
   determining if the tubing and optionally other features is sufficiently identified from the at least one captured image and/or video, and if determined as sufficient, continue to produce a processed representation, and if determined as not sufficient, continue to an evaluation of whether more images and/or videos should be captured;
   determining if more images and/or videos should be captured, and
   if more images and/or videos should be captured, proceeding to identification of problem areas, and if determined that more images and/or videos would not improve the processed representation, proceed to indication;

indicating that certain part of the tubing and/or features are not identified, and proceed to produce a processed representation;

identifying a problem area in the at least one captured image and/or video and proceed to selecting active action;

selecting a suitable active action, from a predefined list of active actions based on an analysis of the problem area;

informing the operator on the selected active action and how it should be performed and returning to the capturing step.

6. The method according to claim 1, wherein the verifying step further comprises:

establishing a link between the flow path representation and the processed representation;

producing an enhanced image in which the tubing and units belonging to a particular flow path have a common identification.

7. The method according to claim 6, further comprising providing setup assistance for a new process or modification of an existing system.

8. The method according to claim 7, further comprising:

identifying or constructing a flow path graph representing a new process or a modified process;

using the established link between the flow path representation and the processed representation to produce at least one of the following:

an enhanced image of the bioprocess system illustrating how the tubing should be connected to the units;

a series of enhanced images stepwise illustrating how each tubing connection, or a selection of tubing, should be connected to the units; and an augmented live view of the bioprocess system stepwise illustrating how each tubing connection, or a selection of tubing, should be connected to the units.

9. A system for automated configuration detection in a bioprocess system, the system comprising:

a bioprocess system arranged to run a process defined by a flow path representation, a memory configured to store instructions for the automated configuration detection, a processor configured to execute the instructions, a GUI and a camera, wherein the camera is adapted to capture at least one image and/or video of the bioprocess system comprising a network of tubing, wherein the network of tubing is a network of disposable tubing for fluid communication between units of the bioprocess system, and to transfer the least one image and/or video to the processor;

when the instructions are executed by the processor, the processor is configured to:

receive the at least one captured image and/or video from the camera, host an analyzing routine adapted to analyze the at least one captured image and/or video to identify at least a part of the tubing connecting units of the bioprocess system;

produce a processed representation from the at least one captured image and/or video wherein at least a part of the tubing connection is identified;

present the processed representation on the GUI; and verify the process in the bioprocess system by comparing the processed representation with the flow path representation to verify their functional concordance.

10. The system according to claim 9, when the instructions are executed by the processor.

* * * * *